US008753129B2

(12) United States Patent
Worley

(10) Patent No.: US 8,753,129 B2
(45) Date of Patent: Jun. 17, 2014

(54) ELECTRICAL HINGE CONNECTOR

(75) Inventor: Andrew Worley, Stroud (GB)

(73) Assignee: GE Aviation Systems Limited (GB)

( * ) Notice: Subject to any disclaimer, the term of this patent is extended or adjusted under 35 U.S.C. 154(b) by 195 days.

(21) Appl. No.: 13/389,885

(22) PCT Filed: Aug. 6, 2010

(86) PCT No.: PCT/GB2010/051304
§ 371 (c)(1),
(2), (4) Date: Apr. 25, 2012

(87) PCT Pub. No.: WO2011/018650
PCT Pub. Date: Feb. 17, 2011

(65) Prior Publication Data
US 2012/0202360 A1 Aug. 9, 2012

(30) Foreign Application Priority Data
Aug. 11, 2009 (GB) .................... 0914027.8

(51) Int. Cl.
H01R 39/00 (2006.01)
(52) U.S. Cl.
USPC ........................................... 439/31; 439/534
(58) Field of Classification Search
USPC .................... 439/31, 165, 534, 713
See application file for complete search history.

(56) References Cited

U.S. PATENT DOCUMENTS

| 1,744,040 | A | 1/1930 | Elzer |
|---|---|---|---|
| 2,688,733 | A | 9/1954 | Walter, Jr. |
| 2,778,000 | A | 1/1957 | Mills |
| 3,199,059 | A | 8/1965 | Masse |
| 3,838,234 | A | 9/1974 | Peterson |
| 3,857,625 | A | 12/1974 | Crane |
| 3,860,312 | A | 1/1975 | Gordon, Jr. |
| 4,412,711 | A | 11/1983 | Suska |
| 5,212,907 | A | 5/1993 | Van Sandt |
| 6,083,010 | A | 7/2000 | Daoud |
| 7,214,067 | B2 | 5/2007 | Zaderej |
| 7,682,170 | B2 | 3/2010 | Hori et al. |
| 2008/0076270 | A1 | 3/2008 | Jao |
| 2008/0101052 | A1 | 5/2008 | Lee |

FOREIGN PATENT DOCUMENTS

| CN | 1666389 A | 9/2005 |
|---|---|---|
| CN | 1938896 A | 3/2007 |
| CN | 101150938 A | 3/2008 |

(Continued)

OTHER PUBLICATIONS

Office Action from corresponding GB Application No. 0914027.8, dated Jan. 2, 2013.

(Continued)

Primary Examiner — Khiem Nguyen
(74) Attorney, Agent, or Firm — Global Patent Operation; Vivek P. Shankam

(57) ABSTRACT

A hinge for an aircraft power distribution system unit is provided. The unit has a housing comprising a first housing part and a second housing part. The hinge comprises a first hinge member for connection to the first housing part of the unit; and a second hinge member for connection to the second housing part of the unit, wherein the first and the second hinge members comprise an electrically conductive material and wherein the first and the second hinge members are connectable to one another to establish an electrical connection between the first and the second hinge members and to allow relative rotation between the first and the second hinge members.

12 Claims, 5 Drawing Sheets

(56) References Cited

FOREIGN PATENT DOCUMENTS

| DE | 1010635 | C1 | 8/2002 |
| DE | 10315208 | A1 | 10/2004 |
| EP | 0547838 | A1 | 6/1993 |
| GB | 812878 | A | 5/1959 |
| GB | 2228630 | A | 8/1990 |
| WO | 9403947 | A2 | 2/1994 |
| WO | 2005096432 | A1 | 10/2005 |

OTHER PUBLICATIONS

Search Report and Written Opinion from corresponding PCT Application No. PCT/GB2010/051304, dated Oct. 21, 2010.
Unofficial English translation of a CN Office Action dated Jan. 13, 2014, issued in connection with corresponding CN Application No. 201080036752.3.

US 8,753,129 B2

ELECTRICAL HINGE CONNECTOR

CROSS REFERENCE TO RELATED APPLICATIONS

This is a national stage application under 35 U.S.C. §371 (c) of prior-filed, co-pending PCT patent application serial number PCT/GB2010/051304, filed on Aug. 6, 2010 which claims priority to British Patent Application Serial No. 0914027.8, filed on Aug. 11, 2009, the entire contents of which are incorporated herein by reference.

BACKGROUND OF THE INVENTION

1. Field of the Invention

Embodiments of the present invention relate to hinges that provide an electrical connection, more particularly, for use in aircraft electrical power systems. Embodiments of the present invention further relate to electrical power distribution systems for aircraft.

2. Description of the Prior Art

Factors governing the design of modern power distribution systems which are installed in aircraft include cost, weight and volume. To drive down the overall package size, design measures are taken which utilize every available surface and space. However general operation and maintenance access is required over the life of the part and therefore components are often mounted on a hinged door on the unit.

For primary power distribution, the components mounted on the door can require current feeds up to and in excess of 500 A. Such large currents require cable feeds which are bulky, heavy and inherently inflexible. As an example, some cables need to be as thick as 15 mm in diameter in order to carry the required current. As a result a great deal of space is required to accommodate the excess cable which brings with it additional weight, greater opening and closing forces to operate the door, and largely unpredictable wear and tear of the cable strands which are forced to act in a manner in which they are not mechanically designed to operate.

One solution that has been proposed to overcome the problem of the amount of volume required is to allocate space in the unit to accommodate the excess cable. This however does not reduce the resistance to flex in the cable. An additional solution in the prior art has been to transmit the power across the door hinge by multiple cables in a bundle. This enables increased flexibility and therefore reduces the force required to open and close the door, however using multiple 'thinner' cables increases weight through the increased cross-sectional area of insulation and bundle retention. This also carries with it the risk of undetected faults if a wire breaks while others are connected in parallel.

BRIEF SUMMARY OF THE INVENTION

According to an embodiment of the present invention, a hinge for an aircraft power distribution system unit is provided. The unit has a housing comprising a first housing part and a second housing part. The hinge comprises a first hinge member for connection to the first housing part of the unit, and a second hinge member for connection to the second housing part of the unit, wherein the first and second hinge members comprise an electrically conductive material and wherein the first and the second hinge members connectable to one another to establish an electrical connection between the first and the second hinge members and to allow relative rotation between the first and the second hinge members.

According the another embodiment of the present invention, a power distribution system unit for an aircraft having a housing comprising a first housing part and a second housing part rotatably connected to one another by a hinge is provided. The hinge comprises a first hinge member for connection to the first housing part of the unit, and a second hinge member for connection to the second housing part of the unit, wherein the first and the second hinge members comprise an electrically conductive material and wherein the first and the second hinge members are connectable to one another to establish an electrical connection between the first and the second hinge members and to allow relative rotation between the first and the second hinge members.

BRIEF DESCRIPTION OF THE DRAWINGS

There follows a detailed description of embodiments of the present invention, by way of example only, with reference to the accompanying drawings, in which.

DETAILED DESCRIPTION OF THE INVENTION

Figure 1:
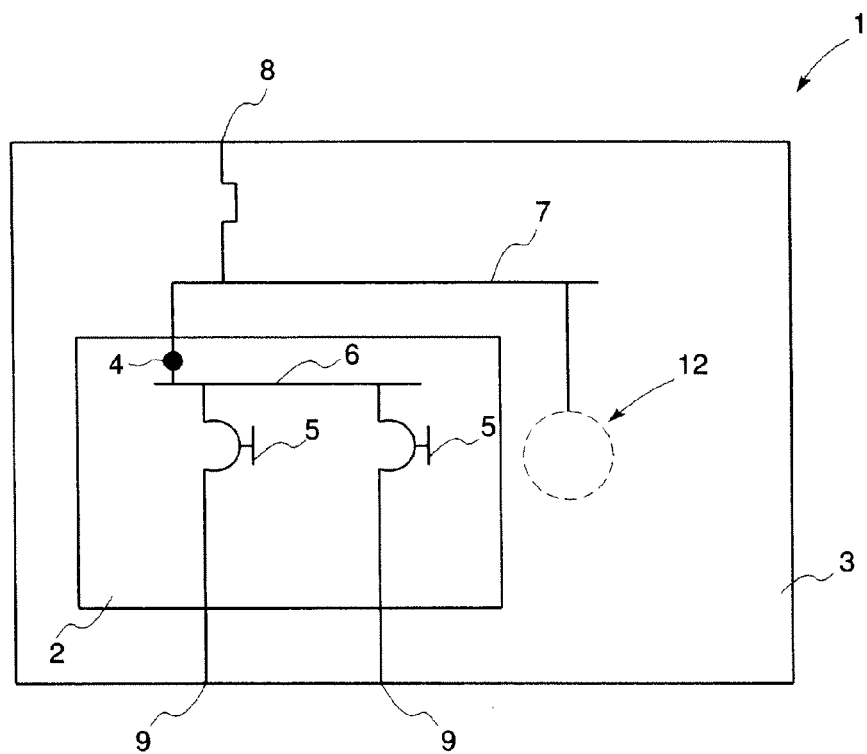
FIG. 1 shows schematically a unit of an aircraft power distribution system according to an embodiment of the present invention.

A unit 1 of an aircraft electrical power distribution system is shown in FIG. 1 comprising a first housing part 3 and a second housing part 2. The second housing part 2 comprises a door rotatably connected via a hinge 4 to the first housing part 3, the first housing part comprising a main body of the unit 1. Electrical current enters the unit 1 via a power input 8, which provides power to an electrical bus 7 for distributing current to electrical loads 12 provided within the unit. Power is also transmitted from the input 8 to an electrical bus 6 that is mounted on the door 2 of the unit. In the embodiment shown, the bus 6 on the door 2 is connected to the power input 8 via the bus 7 in the unit. The hinge 4 which connects the door 2 to the main body 3 of the unit 1 comprises electrically conductive material, whereby current can be conducted to the electrical bus 6. Further, one or more electrical devices 5 are mounted on the door 2, preferably on the interior side of the door, and draw power from the bus 6, the devices being connected to corresponding power outputs 9. Where cable is used for the power outputs 9, this can be achieved using thinner, more flexible wires than those needed for the power input. In another embodiment, the power output could be transmitted across a second hinge not shown in FIG. 1.

Figure 2:
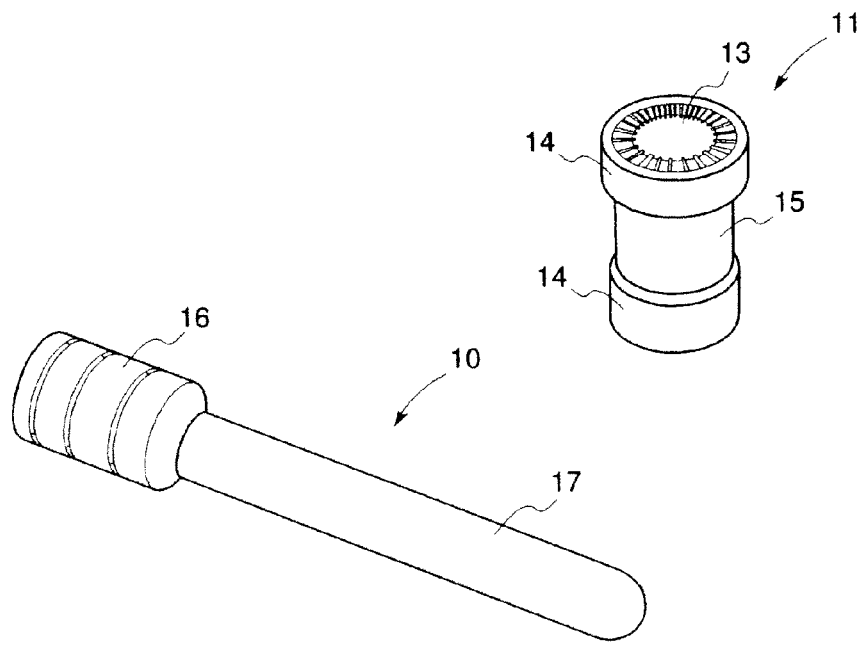
FIG. 2 shows first and second hinge members according to an embodiment of the present invention.

FIG. 2 shows two components of the hinge 4 comprising a first hinge member 11 and a second hinge member 10, respectively comprising a receptacle 11 and a protrusion 17 for rotatable engagement in the receptacle. The receptacle 11 comprises a hyperboloid socket 11 having a circular cross-section and including a cylindrical cavity 13 for receiving the protrusion 17, the end portions 14 of the receptacle 11 having a greater thickness and hence an enhanced strength compared to a central part 15 of the receptacle. The second hinge member 10 can connect to the receptacle with a push-fit mechanism. In this regard, the internal structure of the hyperboloid socket 11 (not shown) includes a series of wires extending along the periphery of the cylindrical cavity 13 between the end portions 14, the end portions being twisted with respect to one another about a longitudinal axis of the socket, whereby the wires form a constriction towards the middle of the socket. The protrusion 17 of the second hinge member is cylindrical and adapted for mating insertion in the cylindrical cavity 13 of the receptacle, the longitudinal axis of the protrusion 17 coinciding with the axis of rotation of the hinge. The cylindrical surface of the protrusion 17 and the internal structure of the cavity 13 provide a reliable surface contact over a large area between the first and second hinge members thereby providing a good electrical connection between the hinge members capable of carrying the high currents required by aircraft power distribution systems. Further, the internal constriction of the socket facilitates the fixture of the protrusion within the socket. At an end of the second hinge member 10 opposed to the protrusion, the second hinge member comprises a root portion 16 for connection to a busbar 18 shown in FIG. 4, which supplies power to the door-mounted electrical devices 5. Both the first and second hinge members 10, 11 are made from electrically conductive materials, such as metals.

Figure 3:
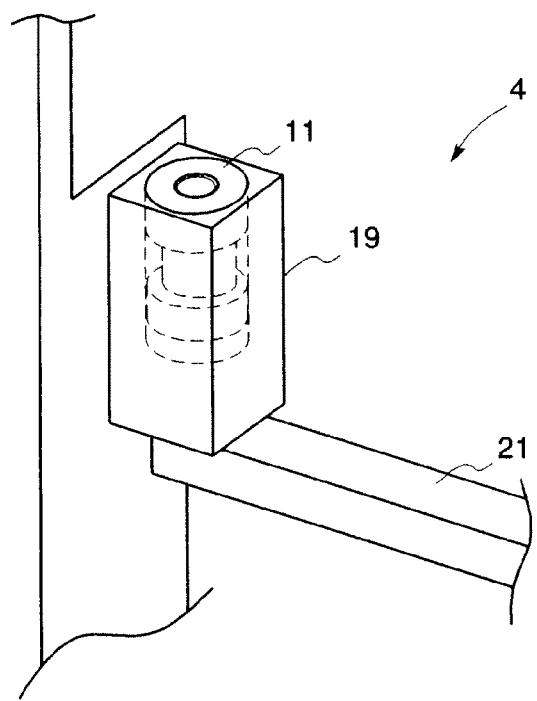
FIG. 3 is a perspective view of a part of the hinge according to an embodiment of the present invention.

Referring to FIG. 3, the receptacle 11 of the hinge is connected to the housing by means of a mount 19 and a conductor 21 feeds current to the receptacle 11 from the bus 7. The electrical connection between the conductor bar 21 and the receptacle can be provided by means of a subsidiary connector (not shown in the drawings), which can extend through the mount 19. The mount 19 itself preferably comprises an electrically insulating material, which advantageously insulates the unit housing from the electrical current.

Figure 4:
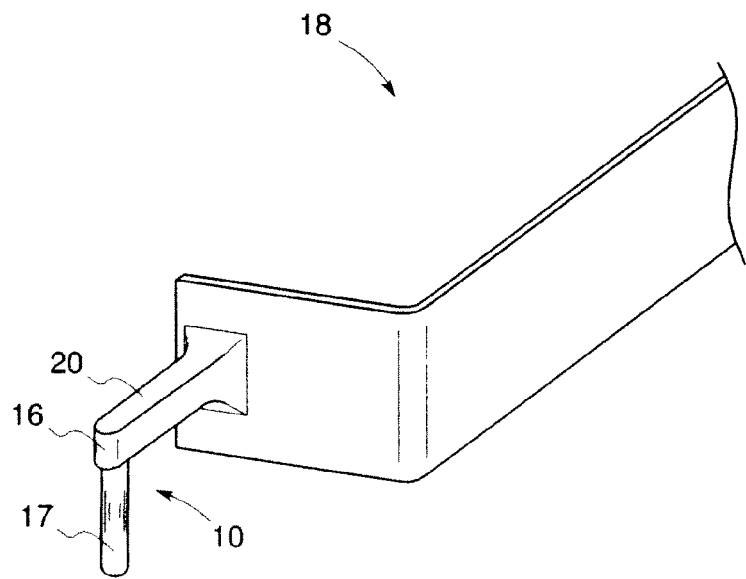
FIG. 4 is a perspective view of a busbar connectable to the hinge part shown in FIG. 3 according to an embodiment of the present invention.
Figure 6:
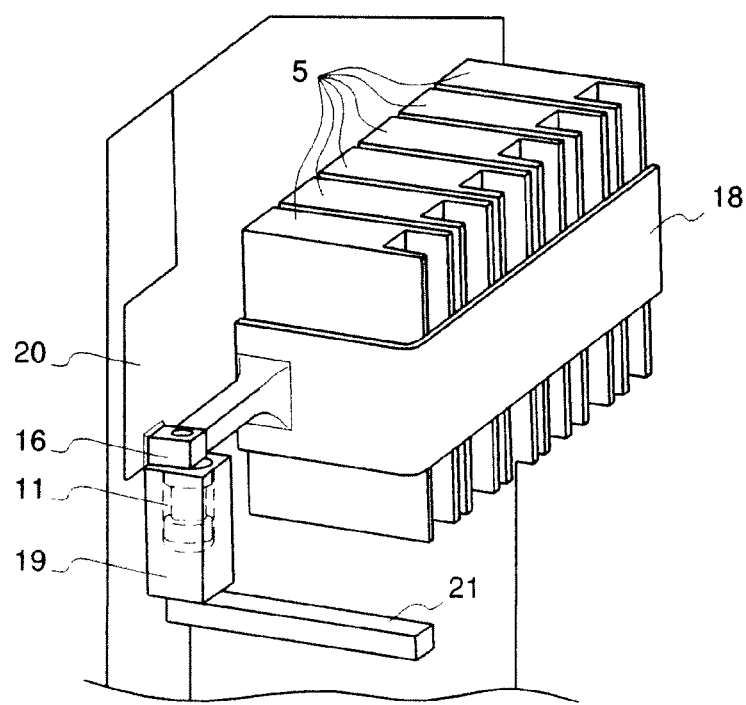
FIG. 6 shows an assembled hinge including the busbar shown in FIG. 4 according to an embodiment of the present invention.

FIG. 4 shows a busbar 18 which can be mounted on the door 2 of the unit and has the second hinge member 10 formed integrally therewith. In another embodiment, the second hinge member is manufactured separately to the busbar 18 and is connected thereto by means of an electrically conductive joint. As shown in FIG. 6, the busbar 18 supplies power to the electrical devices 5 and ensures that the electrical devices 5 are firmly held in place on the inside of the door.

Figure 5:
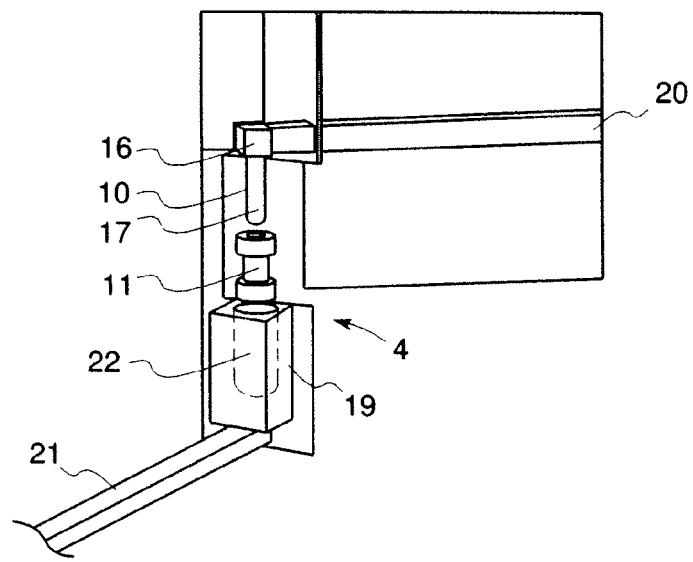
FIG. 5 is a perspective view of a partially assembled hinge according to an embodiment of the present invention.

In FIG. 5, the hinge 4 is shown in a partially assembled or exploded view. The assembly of the hinge involves disposing the mount 19 on the main body of the unit 1. The receptacle 11 is inserted into a channel 22 in the mount 19 and the protrusion 17 of the second hinge member 10 is inserted into the cylindrical cavity 13 of the receptacle 11. The order in which these steps are carried out can be varied.

FIG. 6 shows the hinge assembled, including a plurality of electrical devices 5 mounted underneath the busbar 18. For example, one or more of the electrical devices 5 may comprise circuit breakers. The busbar 18 provides the input current to the circuit breakers 5, the output current from the circuit breakers 5 being significantly lower. Thus the output current can be carried by thin, flexible wires, which can be accommodated in the unit and do not offer an excessive resistance to the opening and closing of the door 2.

Figure 7:
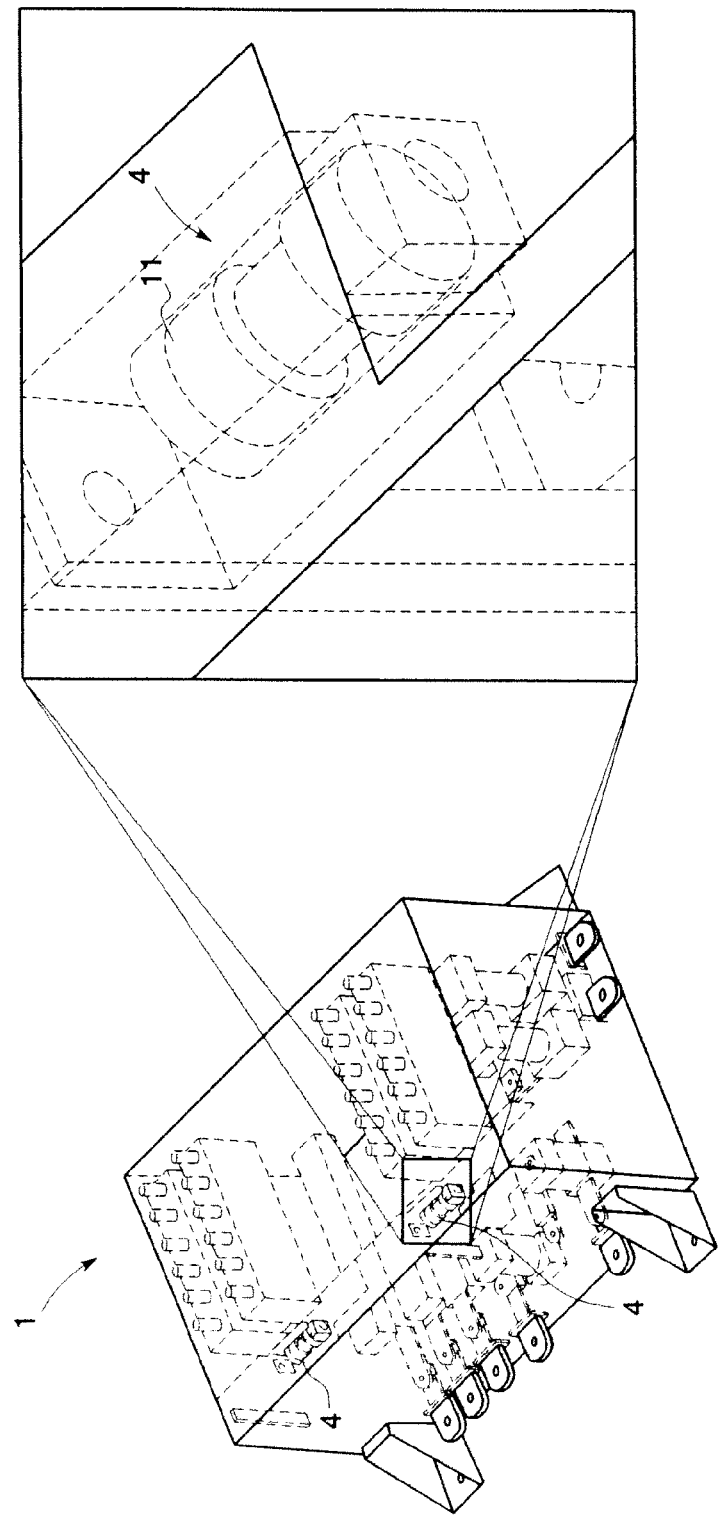
FIGS. 7 and 8 are perspective views of a unit of an aircraft power distribution system including a hinge according to an embodiment of the present invention.
Figure 8:
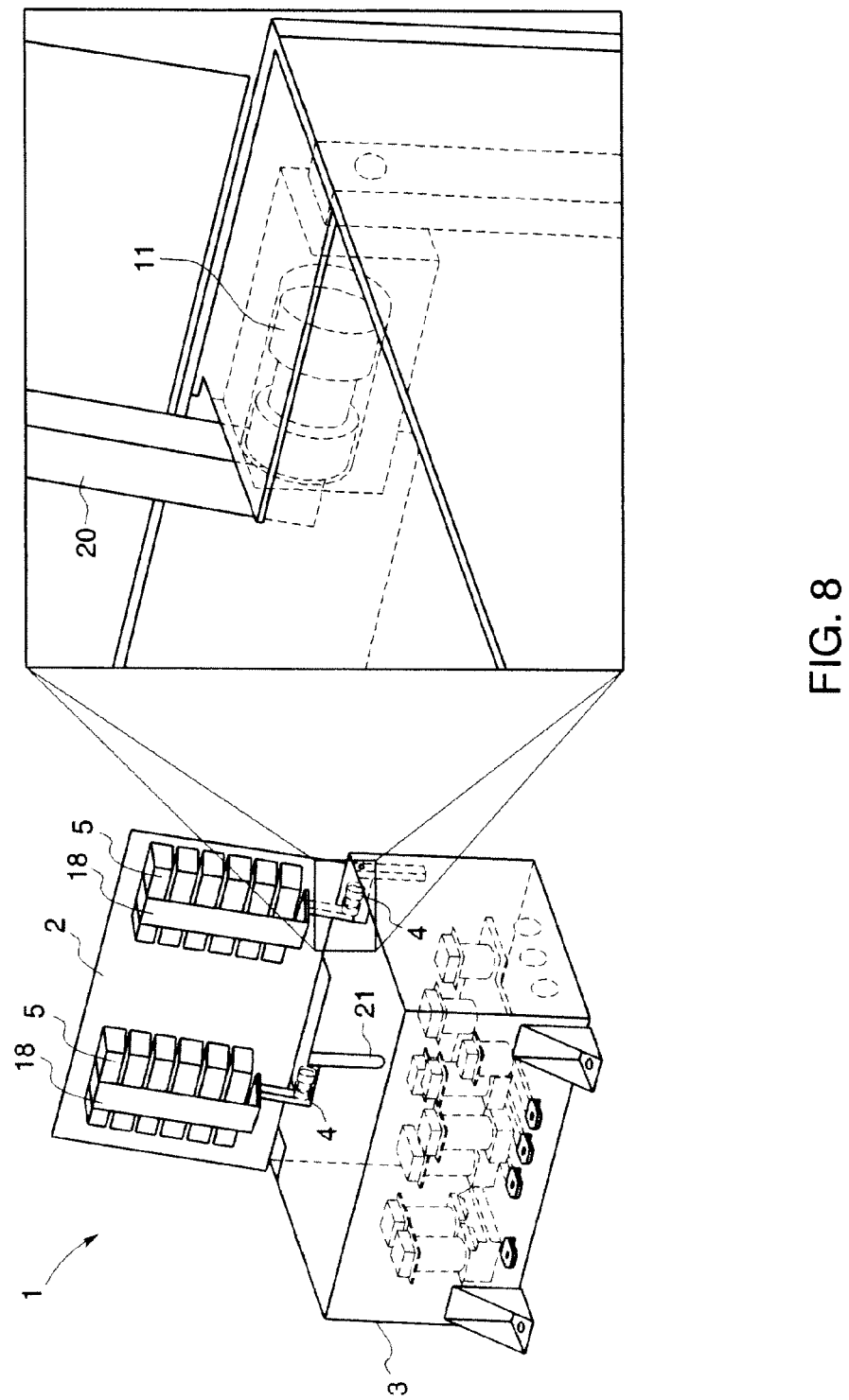

FIGS. 7 and 8 show an assembled unit 1 of an aircraft power distribution system. First and second busbars 18 are provided on the interior side of the door, connected respectively to first and second hinges 4. First and second conductors 21 feed current respectively to the first and second hinges 4. In FIG. 7 the unit is shown in the closed position, while in FIG. 8, the door of the unit is open to allow access to the components within. The hinge 4 allows for 120 degrees of door rotation, which is typically required for maintenance access. In the embodiment shown in FIGS. 7 and 8, each hinge is capable of carrying 200 A of current, allowing for 400 A to be conducted across a pair of hinges. Although the embodiment shown in FIGS. 7 and 8 is a DC system, the hinge can also be used in a system that runs on AC power. The power output is not shown in FIGS. 7 and 8, but again can comprise wires or an output hinge. The size and quantity of the hinges can be varied depending on the specific mechanical and electrical design considerations at hand.

The first and second hinge members can be mounted in reverse to the way shown in FIGS. 7 and 8. In other words, the receptacle 11 can be mounted on the door 2 and the protrusion 17 on the main body 3 of the unit 1. The mount 19 is then provided on the door 2 for receiving the receptacle 11. The first and second hinge members can be manufactured by moulding from plastics materials.

Embodiments of the present invention overcome the problems associated with cable connections, because the hinge allows easy rotation of the door of the unit, requiring a low force to open and/or close the door of the unit, while providing an electrical connection to transmit power to the components mounted on the door within the unit. Thus, no wires are needed to transmit current from the main body of the unit to the door-mounted components. A reduction in the overall volume and weight of the aircraft power distribution system unit is made possible by embodiments of the present invention.

The second hinge member can be removably engagable in a cavity of the first hinge member, whereby the door of the unit can be easily plugged in and removed from the unit, without power cables restricting the motion of the door.

What is claimed is:

1. A hinge for an aircraft power distribution system unit, the unit having a housing comprising a first housing part and a second housing part, the hinge comprising:
   a first hinge member for connection to the first housing part of the unit; and
   a second hinge member for connection to the second housing pan of the unit,
   wherein the first and the second hinge members comprise an electrically conductive material and wherein the first and the second hinge members are connectable to one another to establish an electrical connection between the first and the second hinge members and to allow relative rotation between the first and the second hinge members,
   wherein the first hinge member comprises a receptacle and the second hinge member comprises a protrusion for engagement in the receptacle,
   wherein the receptacle comprises a hyperboloid socket for receiving the protrusion, the hyperboloid socket haying a cylindrical cavity,
   wherein the protrusion is cylindrical and adapted for mating insertion in the cylindrical cavity,
   wherein the hyperboloid socket provides an internal constriction to facilitate fixture of the protrusion within the socket and electrical connection between the first and second hinge members.

2. The hinge according to claim 1, wherein the second hinge member is removably engagable in the cylindrical cavity of the first hinge member.

3. The hinge according to claim 1, wherein a longitudinal axis of the protrusion Coincides with an axis of rotation of the hinge.

4. The hinge according to claim 1, wherein the first and/or second hinge member is connected to a busbar for distributing electrical power to at least one electrical components.

5. The hinge according to claim 4, wherein the first and/or second hinge member is formed integrally with the busbar.

6. The hinge according to claim 1, wherein the first and second hinge members are electrically insulated from the exterior of the unit.

7. A power distribution system unit for an aircraft having a housing comprising a first housing part and a second housing part rotatably connected to one another by a hinge, the hinge comprising:
- a first hinge member for connection to the first housing part of the unit; and
- a second hinge member for connection to the second housing part of the unit,
- wherein the first and the second hinge members comprise an electrically conductive material and wherein the first and the second hinge members are connectable the one another to establish an electrical connection between the first and the second hinge members and to allow relative rotation between the first and the second hinge members,
- wherein the first binge member comprises a receptacle and the second hinge member comprises a protrusion for engagement in the receptacle,
- wherein the receptacle comprises a hyperboloid socket for receiving the protrusion, the hyperboloid socket having cylindrical cavity,
- wherein the protrusion is cylindrical and adapted for mating insertion in the cylindrical cavity,
- wherein the hyperboloid socket provides an internal constriction to facilitate fixture of the protrusion within the socket and electrical connection between the first and second hinge members.

8. The system according, to claim 7, wherein the hinge is positioned inside the first and/or the second housing parts.

9. The system according to claim 7, wherein the first and the second hinge members are connected to the first, and the second housing parts respectively.

10. The system according to claim 7, wherein the first housing part comprises a main body of the unit.

11. The system according to claim 7, wherein the second housing part comprises a door of the unit.

12. The system according to claim 7, wherein the first hinge member comprise a receptacle connected to the first housing part by a mount.

* * * * *

UNITED STATES PATENT AND TRADEMARK OFFICE
CERTIFICATE OF CORRECTION

PATENT NO.       : 8,753,129 B2
APPLICATION NO.  : 13/389885
DATED            : June 17, 2014
INVENTOR(S)      : Worley It is certified that error appears in the above-identified patent and that said Letters Patent is hereby corrected as shown below:

In the Claims

In Column 4, Line 43, in Claim 1, delete "pan of" and insert -- part of --, therefor.

In Column 4, Line 66, in Claim 3, delete "Coincides" and insert -- coincides --, therefor.

In Column 5, Line 18, in Claim 7, delete "the one" and insert -- to one --, therefor.

In Column 5, Line 22, in Claim 7, delete "binge" and insert -- hinge --, therefor.

In Column 6, Line 10, in Claim 8, delete "according," and insert -- according --, therefor.

In Column 6, Line 14, in Claim 9, delete "first," and insert -- first --, therefor.

Signed and Sealed this
First Day of September, 2015

Michelle K. Lee
*Director of the United States Patent and Trademark Office*